(12) United States Patent
Ma et al.

(10) Patent No.: US 11,048,036 B2
(45) Date of Patent: Jun. 29, 2021

(54) MULTIVIEW DISPLAYS HAVING A REFLECTIVE SUPPORT STRUCTURE

(71) Applicant: LEIA INC., Menlo Park, CA (US)

(72) Inventors: Ming Ma, Palo Alto, CA (US); David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 29 days.

(21) Appl. No.: 16/447,884

(22) Filed: Jun. 20, 2019

(65) Prior Publication Data

US 2019/0302340 A1    Oct. 3, 2019

Related U.S. Application Data

(63) Continuation of application No. PCT/US2016/068935, filed on Dec. 28, 2016.

(51) Int. Cl.
*G02F 1/13357* (2006.01)
*F21V 8/00* (2006.01)
*G02B 27/42* (2006.01)
*G02B 30/26* (2020.01)

(52) U.S. Cl.
CPC ......... *G02B 6/0035* (2013.01); *G02B 6/0055* (2013.01); *G02B 27/42* (2013.01); *G02B 30/26* (2020.01); *G02F 1/133605* (2013.01); *G02F 1/133615* (2013.01)

(58) Field of Classification Search
CPC ................................................ G02F 1/133605
See application file for complete search history.

(56) References Cited

U.S. PATENT DOCUMENTS

| | | | |
|---|---|---|---|
| 8,350,987 B2 | 1/2013 | Yang et al. | |
| 8,780,013 B2 | 7/2014 | Nam et al. | |
| 9,201,270 B2 | 12/2015 | Fattal et al. | |
| 2007/0258140 A1 | 11/2007 | Shestak et al. | |
| 2010/0309410 A1* | 12/2010 | Yang .................... | G02B 6/0088 349/64 |
| 2011/0310233 A1 | 12/2011 | Bathiche et al. | |

(Continued)

FOREIGN PATENT DOCUMENTS

| | | |
|---|---|---|
| CN | 203868938 U | 10/2014 |
| EP | 2802148 A1 | 11/2014 |

(Continued)

OTHER PUBLICATIONS

International Search Report and Written Opinion (ISRWO) by International Searching Authority (ISA) Korean Intellectual Property Office (KIPO) dated Aug. 18, 2017 (11 pages) for counterpart PCT Application PCT/US2016/068935.

(Continued)

*Primary Examiner* — Edmond C Lau
(74) *Attorney, Agent, or Firm* — J. Michael Johnson

(57) ABSTRACT

Multiview displays include a reflective support structure located between a backlight and a screen. The backlight includes a plate light guide configured to couple out light that propagates within the plate light guide using multibeam elements. The reflective support structure reflects light incident on a portion of the surface that abuts the reflective support structure back into the plate light guide. The screen includes an array of multiview pixels configured to modulate coupled out light to create a multiview image.

21 Claims, 10 Drawing Sheets

(56) References Cited

U.S. PATENT DOCUMENTS

| | | |
|---|---|---|
| 2012/0002295 A1 | 1/2012 | Dobschal et al. |
| 2012/0127751 A1 | 5/2012 | Kimmel |
| 2012/0195072 A1 | 8/2012 | Minami |
| 2013/0088891 A1 | 4/2013 | Minami |
| 2013/0169694 A1* | 7/2013 | Chen .................. G02B 6/0035 345/690 |
| 2014/0036531 A1* | 2/2014 | Kim .................. G02B 6/0036 362/607 |
| 2014/0300840 A1* | 10/2014 | Fattal ................ G02F 1/133615 349/15 |
| 2015/0016777 A1 | 1/2015 | Abovitz et al. |
| 2015/0036068 A1 | 2/2015 | Fattal et al. |
| 2016/0065955 A1 | 3/2016 | Kim et al. |
| 2016/0320620 A1 | 11/2016 | Maimone |
| 2017/0363794 A1 | 12/2017 | Wan et al. |
| 2018/0011237 A1 | 1/2018 | Fattal |
| 2018/0188441 A1 | 7/2018 | Fattal |
| 2018/0188691 A1 | 7/2018 | Fattal |
| 2018/0196194 A1 | 7/2018 | Fattal |
| 2018/0299608 A1 | 10/2018 | Fattal et al. |
| 2019/0025494 A1 | 1/2019 | Fattal et al. |
| 2019/0155105 A1 | 5/2019 | Aieta et al. |

FOREIGN PATENT DOCUMENTS

| | | |
|---|---|---|
| JP | 2009175328 A | 8/2009 |
| JP | 2013104914 A | 5/2013 |
| KR | 20100135005 A | 12/2010 |
| TW | I547740 B | 9/2016 |
| WO | 2012038856 A1 | 3/2012 |
| WO | 2014051623 A1 | 4/2014 |
| WO | 2014081415 A1 | 5/2014 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Maimone, A., et al., Pinlight Displays: Wide Field of View Augmented Reality Eyeglasses using Defocused Point Light Sources, ACM Transactions on Graphics, Jul. 2014, pp. 89.1-89.11, vol. 33, No. 4, Article 89.

* cited by examiner

MULTIVIEW DISPLAYS HAVING A REFLECTIVE SUPPORT STRUCTURE

CROSS-REFERENCE TO RELATED APPLICATIONS

This application is a continuation patent application of and claims the benefit of priority to International Application No. PCT/US2016/068935, filed Dec. 28, 2016, which is incorporated by reference herein in its entirety.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

In order to overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
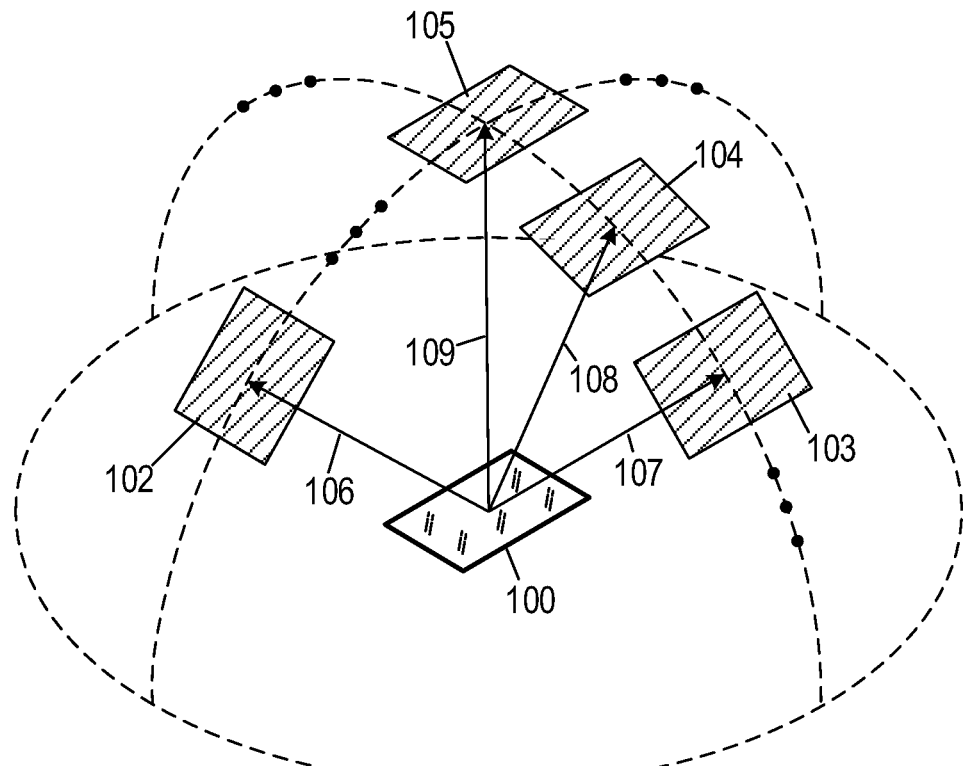
FIG. 1A illustrates a perspective view of a multiview image produced by an example multiview display.

Certain examples and embodiments may have other features that are one of in addition to and in lieu of the features illustrated in the above-referenced figures. These and other features are described below with reference to the above-referenced figures.

DETAILED DESCRIPTION

Examples and embodiments in accordance with the principles described herein provide a multiview display comprising a reflective support structure located between a backlight and a screen. The reflective support structure is configured to maintain a substantially uniform separation distance between the screen and the backlight and to adhere or affix the screen to the backlight. In addition, reflective properties of the reflective support may 'recycle' light propagating within the backlight, according to some embodiments. In particular, the reflective support may recycle light by substantially reflecting light incident on the reflective support back into the light guide. Recycling light in this manner may prevent leakage or unwanted transmission of light from the light guide, according to various embodiments as described below.

A multiview display is an electronic display or display system configured to provide a plurality or number of different views of a multiview image in different view directions. The term 'multiview' as used in the terms 'multiview image' refers to a plurality or a number of views representing different perspective views or including angular disparity between views of the many different views. In addition, the term 'multiview' includes more than two different views (i.e., a minimum of three views and generally more than three views). As such, a 'multiview display' is distinguished from a stereoscopic display. A stereoscopic display displays only two different views to represent a scene or an image. Note however, while multiview images and multiview displays include more than two views, multiview images may be viewed (e.g., on a multiview display) as a stereoscopic pair of images by selecting only two of the multiview views to view at a time (e.g., one view per eye).

A multiview display comprises a screen with a plurality of multiview pixels. Each multiview pixel comprises a plurality of sets of light valves. The multiview display includes a backlight that comprises a light source optically coupled to a plate light guide that is configured with a plurality of multibeam elements. Each multibeam element corresponds to a set of light valves. Further, each multibeam element is spatially offset with respect to a center of each corresponding set of light valves toward a center of the multiview pixel. The sets of light valves modulate the light diffractively coupled out of the corresponding multibeam elements. The spatial offset of the multibeam elements creates an angular offset in modulated light beams emerging from the sets of light valves. The modulated light beams that emerge from the sets of light valves associated with each multiview pixel interleave to create multiview images at a viewing distance from the screen.

FIG. 1A illustrates a perspective view of a multiview image produced by an example multiview display 100. As illustrated in FIG. 1A, the multiview display 100 may simultaneously display multiple images. Each image provides a different view of a scene or object from a different view direction. In FIG. 1A, the view directions are illustrated as arrows extending from the multiview display 100 in various different principal angular directions. The different views are illustrated as shaded polygonal panels at the termination of the arrows. For example, in FIG. 1A, four polygonal panels 102-105 represent four different views of a multiview image from different corresponding view directions 106-109. Suppose the multiview display 100 is used to display a multiview image of an object (e.g., a three-dimensional object within a scene). When an observer views the multiview display 100 in the direction 106, the observer sees the view 102 of the object. However, when the observer views the multiview display 100 from the view direction 109, the observer sees a different view 105 of the same object. Note that for simplicity of illustration the different views are illustrated in FIG. 1A as being above the multiview display 100. In practice, the different views are actually simultaneously displayed on a screen of the multiview display 100, enabling an observer to view an object or scene from different view directions by simply changing the observer's view direction of the multiview display 100.

A view direction or equivalently a light beam having a direction corresponding to a view direction of a multiview display generally has a principal angular direction given by angular components $(\alpha, \beta)$. The angular component $\alpha$ is referred to as the 'elevation component' or 'elevation angle' of the light beam. The angular component $\beta$ is referred to as the 'azimuth component' or 'azimuth angle' of the light beam. The elevation angle $\alpha$ is an angle in a vertical plane (e.g., perpendicular to a plane of the screen of the multiview display) while the azimuth angle $\beta$ is an angle in a horizontal plane (e.g., parallel to the plane of the screen of the multiview display).

Figure 1B:
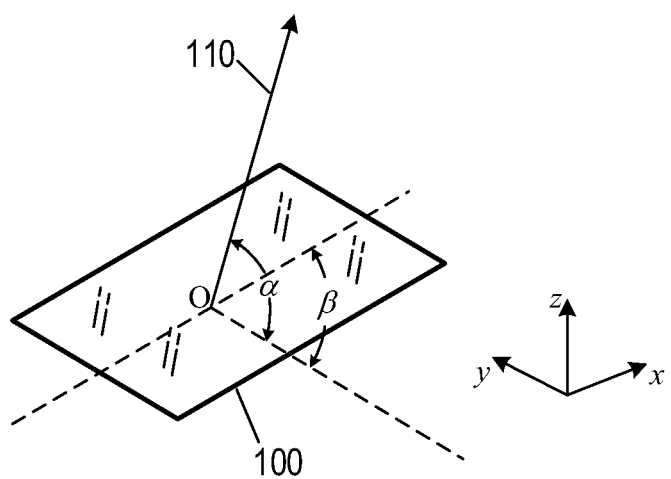
FIG. 1B illustrates a graphical representation of angular components of a light beam emanating from a point of a multiview display.

FIG. 1B illustrates a graphical representation of the angular components $(\alpha, \beta)$ of a light beam 110 emitted or emanating from a point of the multiview display 100 with a particular principal angular direction corresponding to a view direction, such as the view direction 108 in FIG. 1A. The light beam 110 has a central ray associated with a particular point of origin 'O' within the multiview display 100.

The backlight of the multiview display is configured with a plate light guide that diffractively couples out light that propagates within the plate light guide through multibeam elements of the plate light guide. The reflective support structure located between the backlight and the screen abuts a portion of the surface of the plate light guide and is configured to allow transmission of the light diffractively coupled out by way of the multibeam elements. The reflective support structure is configured to recycle light propagating within the plate light guide by reflecting light incident on the portion of the surface that abuts the reflective support structure back into the plate light guide.

Figure 2A:
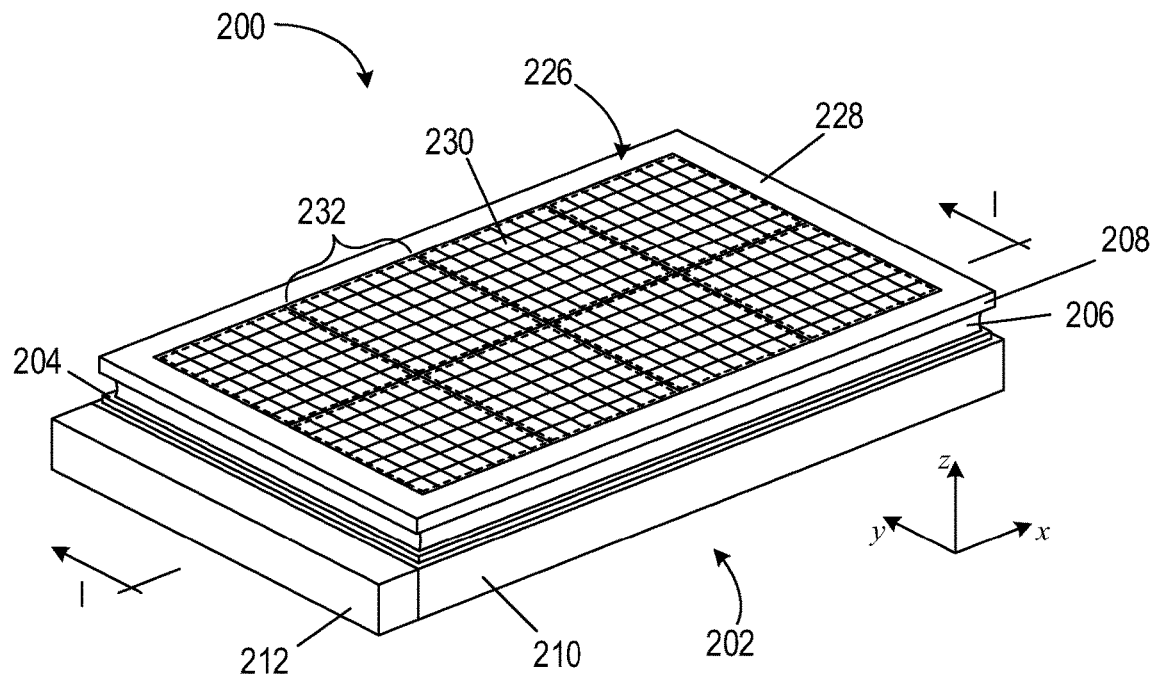
FIG. 2A illustrates an isometric view of an example multiview display.
Figure 2B:
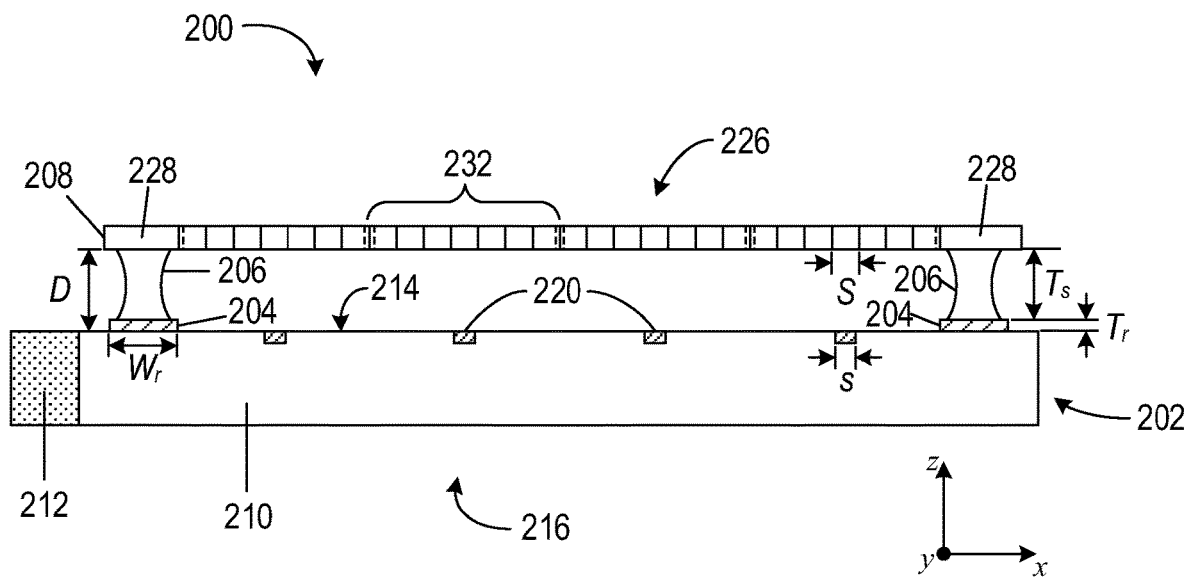
FIG. 2B illustrates a cross-sectional view of the multiview display illustrated in FIG. 2A.
Figure 2C:
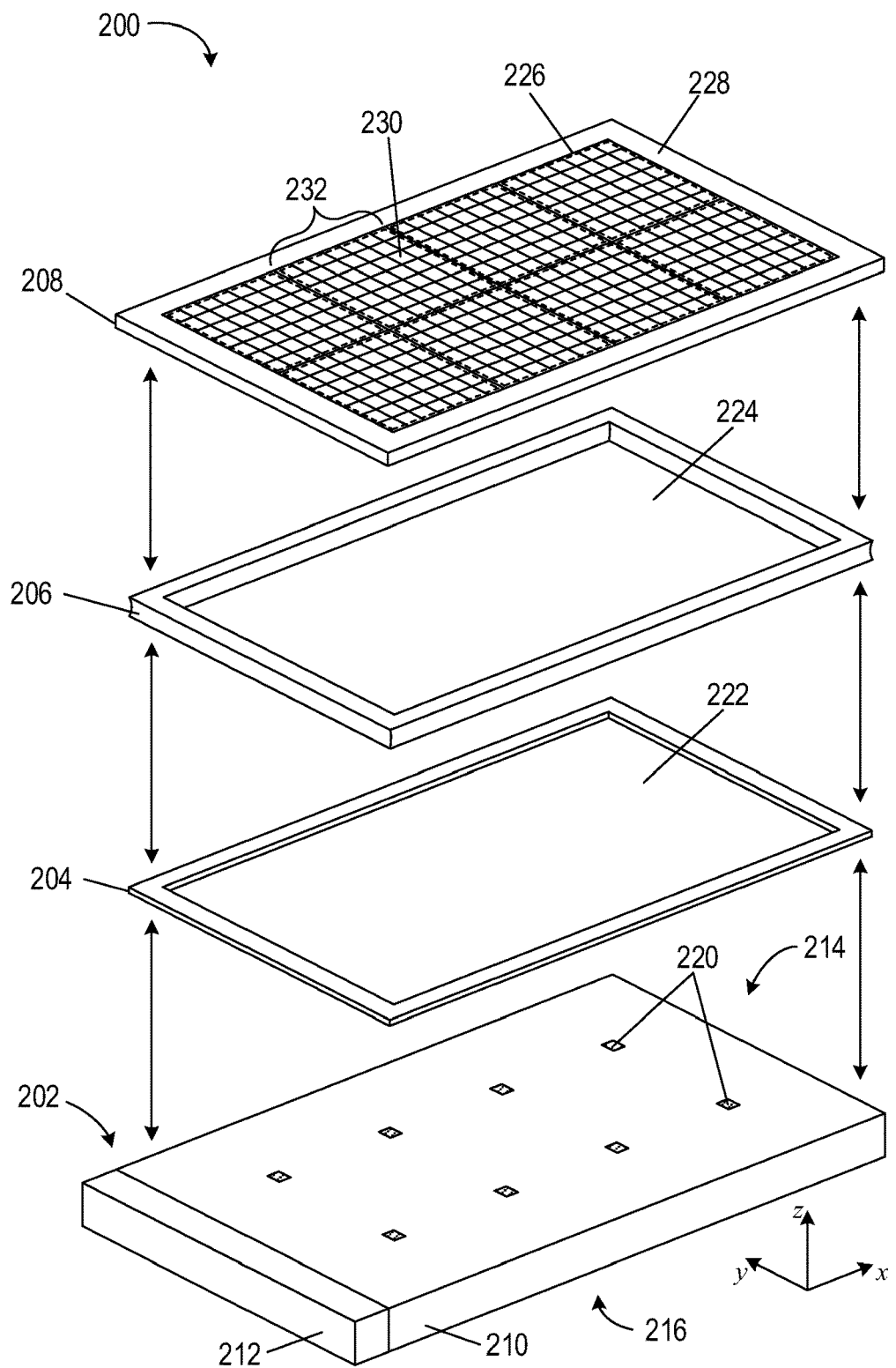
FIG. 2C shows an exploded isometric view of the multiview display illustrated in FIG. 2A.

FIG. 2A illustrates an isometric view of an example multiview display 200. FIG. 2B illustrates a cross-sectional view of the multiview display 200 along a line I-I in FIG. 2A. FIG. 2C illustrates an exploded isometric view of the multiview display 200. As illustrated in FIGS. 2A-2C, the multiview display 200 comprises a multiview backlight 202, a reflective layer 204, a support layer 206, and a screen 208. The multiview backlight 202 comprises a plate light guide 210 and a light source 212 optically coupled to an edge of the plate light guide 210. The plate light guide 210 is configured to guide light generated by the light source 212 between a first surface 214 and a second surface 216 of the plate light guide 210.

In FIGS. 2B and 2C, the plate light guide 210 may be a plate optical waveguide having substantially planar, parallel first and second surfaces 214, 216. The first surface 214 of the plate light guide 210 may be configured with a number of multibeam elements 220. In FIGS. 2B and 2C, the reflective layer 204 has a rectangular shape with an opening 222. In FIG. 2C, the support layer 206 also has a rectangular shape with an opening 224. In FIG. 2B, the support layer 206 is located on a surface of the reflective layer 204. Widths of the straight sections of the reflective layer 204, denoted by $W_r$, are greater than the widths of the straight sections of the support layer 206. In other embodiments, the width of the straight sections of the reflective layer 204 may be approximately equal to the widths of the straight sections of the support layer 206.

In FIGS. 2A-2C, the screen 208 comprises a light valve array 226 surrounded by a screen border 228. The light valve array 226 comprises separate and individually operable light valves 230 that may be selectively switched from opaque to transparent. The light valves 230 may be liquid crystal light valves, electrophoretic light valves, and light valves based on electrowetting. Each of the light valves 230 may be separately modulated to display images on the light valve array 226. As illustrated in FIG. 2B, the screen border 228 is placed on and abuts the support layer 206. The support layer 206 and the reflective layer 204 form a reflective support structure that separates the screen from the plate light guide 210 by a substantially uniform distance D. The support layer 206 may be configured with a thickness, $T_s$, and the reflective layer 204 may be configured with a thickness, $T_r$, that combine to separate the screen 208 from the first surface 214 of the plate light guide 210 by the distance $D=T_s+T_r$. The support layer 206 and the reflective layer 204 may include adhesives that adhere (affix) the screen to the plate light guide 210 The openings 222 and 224 in the corresponding reflective and support layers 204, 206 create an unobstructed space between the light valve array 226 of the screen 208 and the multibeam elements 220 of the first surface 214 of the plate light guide 210. In other words, the openings 222 and 224 are created in order to not block or obstruct light diffractively couple out of the plate light guide 210 toward the light valve array 226.

The plate light guide 210 may comprise any one of a number of different optically transparent materials or comprise any of a variety of dielectric materials including, but not limited to, one or more of various types of glass, such as silica glass, alkali-aluminosilicate glass, borosilicate glass, and substantially optically transparent plastics or polymers, such as poly(methyl methacrylate) or acrylic glass, and polycarbonate. In some embodiments, the plate light guide 210 may include a cladding layer on at least a portion of a surface of the plate light guide 210 (not illustrated) to facilitate total internal reflection (TIR).

The light source 212 may comprise one or more optical emitters. An optical emitter may be a light-emitting diode (LED), a laser, an organic light-emitting diode (OLED), a polymer light-emitting diode, a plasma-based optical emitter, a fluorescent lamp, an incandescent lamp, and any other source of light. The light produced by the light source 212 may be of a particular wavelength (i.e., may be of a particular color), or may be over a range of wavelengths (e.g., white light). In some embodiments, the light source 212 may include sets of optical emitters in which each set of optical emitters produces light of a particular wavelength or a range of wavelengths that is different from the wavelength or range of wavelengths produced by the other sets of optical emitters. For example, the light source 212 may comprise sets of optical emitters in which each set of one or more optical emitters produces one of the primary colors (e.g., red, green, and blue).

As illustrated in FIGS. 2A-2C, the light valve array 226 comprises separate light valves 230 that may be modulated to display images on the light valve array. A multiview pixel comprises an array of two or more light valves. In FIGS. 2A-2C, the light valves of the light valve array 226 are partitioned to create eight multiview pixels. Each multiview pixel comprises a 7×7 array of light valves 230. Each 7×7 array of light valves that forms a multiview pixel is demarcated by a dashed-line square. For example, light valve 230 is one of forty-nine (49) light valves of a multiview pixel 232 demarcated in FIGS. 2A and 2C. A multiview pixel is a set of light valves that represent 'view' pixels in each of a similar number of different views of a multiview display. In particular, a multiview pixel may have an individual light valve corresponding to, or representing, a view pixel in each of the different views of a multiview image. In addition, the light valves of the multiview pixel are also called 'directional pixels' in that each of the light valves is associated with a predetermined view direction of one of the different views. Furthermore, according to various examples and embodiments, the different view pixels represented by the light valves of a multiview pixel may have equivalent or at least substantially similar locations or coordinates in each of the different views. For example, a first multiview pixel may have individual light valves corresponding to view pixels located at $\{x_1, y_1\}$ in each of the different views of a multiview image, while a second multiview pixel may have individual light valves corresponding to view pixels located at $\{x_2, y_2\}$ in each of the different views, and so on.

In some embodiments, a number of light valves in a multiview pixel may be equal to a number of views of the multiview display. For example, a multiview pixel may comprise an array of sixty-four (64) light valves that may be used to create a multiview display having 64 different views. In another example, a multiview display may provide an eight by four array of views (i.e., 32 views) and the multiview pixel may include thirty-two (32) light valves (i.e., one for each view). For example, each different light valve may have an associated direction (e.g., light beam principal angular direction) that corresponds to a different one of the view directions corresponding to the 64 different views. In addition, according to some embodiments, a number of the multiview pixels of the multiview display may be substantially equal to a number of 'view' pixels (i.e., pixels that make up a selected view) in the multiview display views. For example, if a view includes six hundred forty by four hundred eighty view pixels (i.e., a 640×480 view resolution), the multiview display may have three hundred seven thousand two hundred (307, 200) multiview pixels. In another example, when the views include one hundred by one hundred pixels, the multiview display may include a total of ten thousand (i.e., 100×100=10,000) multiview pixels.

According to some embodiments, the multibeam elements 220 may be arranged in either a one-dimensional (1D) array or two-dimensional (2D) array. For example, the multibeam elements 220 may be arranged as a linear 1D array. In another example, the multibeam elements 220 may be arranged as a rectangular 2D array as illustrated in FIG. 2C. In other example, the multibeam elements may be arranged in a circular or elliptical 2D array. In other examples, arrays of multibeam elements (i.e., 1D or 2D array) may be regular or uniformly spaced multibeam elements. In particular, an inter-element distance (e.g., center-to-center distance or spacing) between the multibeam elements 220 may be substantially uniform or constant across the array of multibeam elements. In still other examples, the inter-element distance between the multibeam elements 220 may be varied in one or both of x and y directions.

As illustrated in FIG. 2B, the size of a multibeam element 220, denoted by s, is comparable to the size of the light valve 230, denoted by S, of the light valve array 226. The 'size' may be, but is not limited to, a length, a width or an area of a light valve. For example, the size of a light valve 230 may be a length of the light valve and the comparable size of the multibeam element 220 may also be a length of the multibeam element 220. In another example, size may refer to an area, such as area of the multibeam element 220, comparable to an area of the light valve 230.

In some embodiments, the size of the multibeam element 220 is comparable to the size of a light valve such that the size of the multibeam element is between about fifty percent (50%) and about two hundred percent (200%) of the size of the light valve. For example, the size s of the multibeam element satisfies the following condition:

$$\tfrac{1}{2}S \leq s \leq 2S \tag{1}$$

In other examples, the multibeam element size is greater than about sixty percent (60%) of the light valve size, or about seventy percent (70%) of the light valve size, or greater than about eighty percent (80%) of the light valve size, or greater than about ninety percent (90%) of the light valve size, and the multibeam element is less than about one hundred eighty percent (180%) of the light valve size, or less than about one hundred sixty percent (160%) of the light valve size, or less than about one hundred forty (140%) of the light valve size, or less than about one hundred twenty percent (120%) of the light valve size. For example, by 'comparable size,' the multibeam element size may be between about seventy-five percent (75%) and about one hundred fifty (150%) of the light valve size. In another example, the multibeam element 220 may be comparable in size to the light valve 230 where the multibeam element size is between about one hundred twenty-five percent (125%) and about eighty-five percent (85%) of the light valve size. According to some embodiments, the comparable sizes of the multibeam element 220 and the light valve 230 may be chosen to reduce, or in some examples to minimize, dark zones between views of the multiview display 200, while at the same time reducing, or in some examples minimizing, an overlap between views of the multiview display 200.

Figure 3:
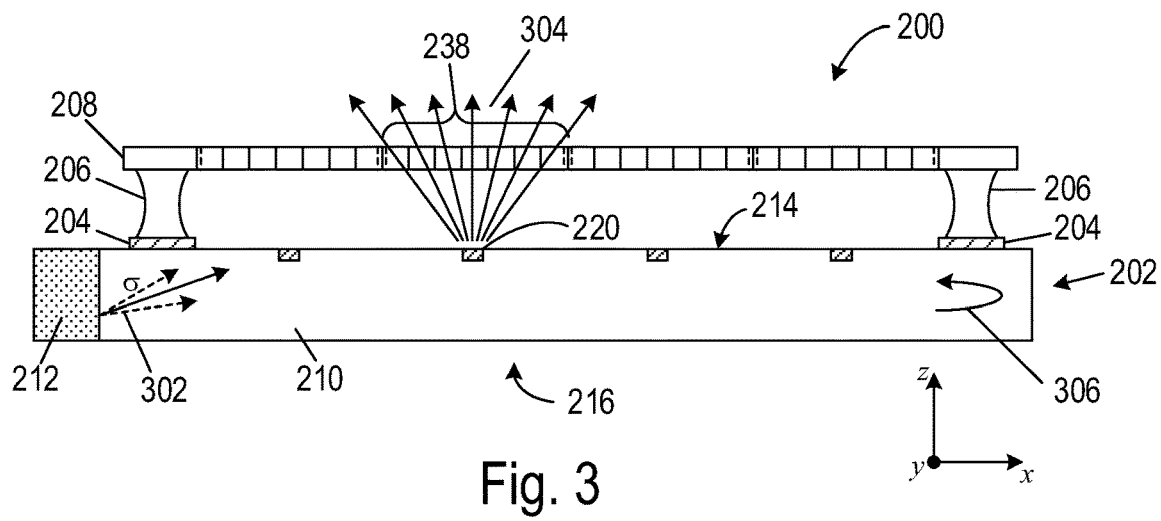
FIG. 3 illustrates a cross-sectional view of light coupled into a plate light guide of a multiview display.

FIG. 3 illustrates a cross-sectional view of the multiview display 200 in which light produced by the light source 212 is input to, or coupled into, the plate light guide 210 as light 302. The light 302 is coupled into the plate light guide 210 at a non-zero propagation angle (e.g., about 30-35 degrees) with respect to the first and second surfaces 214, 216 of the plate light guide 210. One or more lenses, prisms, mirrors or similar reflectors (e.g., a tilted collimating reflector) (not illustrated) may be used to couple light produced by the light source 212 into the plate light guide 210 at the non-zero propagation angle. The light 302 may be input to the plate light guide 210 as collimated light. The degree to which the light 302 is collimated is represented by a collimation factor denoted by σ. The collimation factor defines an angular spread of light rays within the collimated light. For example, a collimation factor σ may specify that a majority of light rays of collimated light 302 is within a particular angular spread (e.g., +/−σ degrees about a central or principal angular direction of the collimated light). The light rays of the collimated light 302 may have a Gaussian distribution in terms of angle and the angular spread may be an angle determined by at one-half of a peak intensity of the collimated light.

Figure 4:
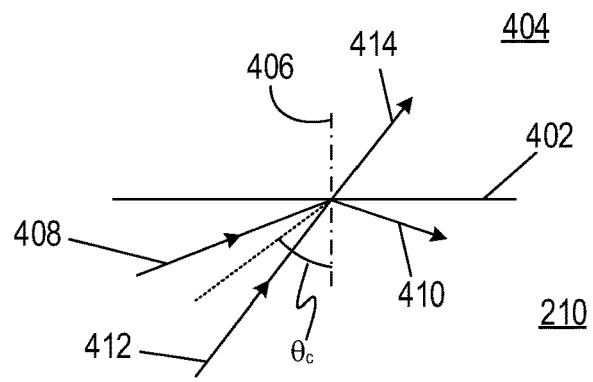
FIG. 4 illustrates total internal reflection at a surface of a plate light guide.

In FIG. 3, the plate light guide 210 guides the light 302 according to TIR at the non-zero propagation angle between the first surface 214 and the second surface 216 of the plate light guide 210. FIG. 4 illustrates trajectories of two rays of light that propagate within the plate light guide 210 and are incident on the same point of a surface 402 (e.g., the first surface 214 or the second surface 216) of the plate light guide 210. The surface 402 is a boundary between the plate light guide 210 and air 404, which has a lower refractive index than the plate light guide 210. Dot-dash line 406 represents a normal and $\theta_c$ denotes a critical angle with respect to the normal. The angle of incidence is measured with respect to the normal. The light incidence on the surface 402 at angles greater than the critical angle $\theta_c$ experiences TIR. For example, because the light represented by directional arrow 408 is incident on the surface 402 at an angle greater than the critical angle $\theta_c$, the light is internally reflected as represented by directional arrow 410. Light incident on the surface 402 at an angle less than the critical angle $\theta_c$, as represented by directional arrow 412, is transmitted as represented by directional arrow 414.

The reflective layer 204 comprises a reflective material, such as, but not limited to, silver or aluminum, located on the first surface 214 of the plate light guide 210. The reflective layer 204 may be pre-formed and deposited as a film or reflective tape around the border of the first surface 214. Alternatively, the reflective layer 204 may be formed by first depositing the reflective material using chemical or physical vapor deposition on the first surface 214 followed by forming the opening 222 using any one or more of wet etching, ion milling, photolithography, anisotropic etching, and plasma etching. The reflective layer 204 reflects light that propagates within the plate light guide 210 and is incident on the first surface 214 beneath the reflective layer 204 back into the plate light guide 210.

Figure 5:
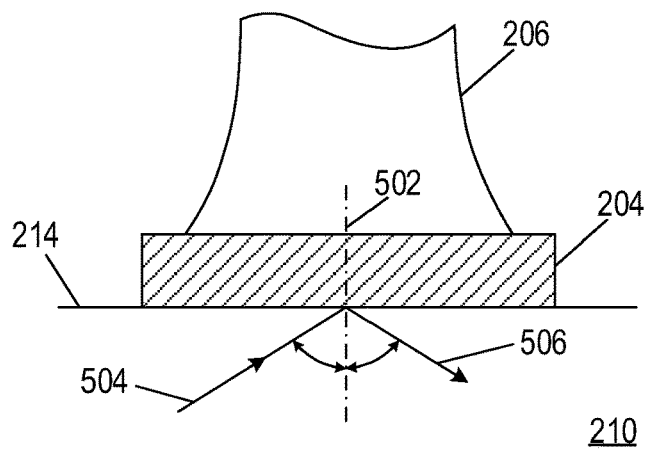
FIG. 5 illustrates a cross-sectional view of a support layer, a reflective layer, and a plate light guide.

FIG. 5 illustrates a cross-sectional view of a portion of the support layer 206, the reflective layer 204, and the plate light guide 210. Dot-dash line 502 represents a normal to the first surface 214 of the plate light guide 210. Directional arrow 504 represents light that is incident on the first surface 214 adjacent to the reflective layer 204. The reflective layer 204 reflects the light back into the plate light guide 110 as represented by directional arrow 506. According to some embodiments, the reflective layer 204 may serve as a nearly perfect specular reflector by reflecting light that is incident on any portion of the first surface 214 that abuts the reflective layer 204 back into the plate light guide 210. The light reflected back into the plate light guide 210 may be recycled by TIR from other surfaces of the plate light guide 210.

The reflective properties of the reflective layer 204 prevents light incident on the first surface 214 adjacent to the support layer 206 from leaking into the support layer 206. Consider, for example, multiview displays configured as described above but without the reflective layer 204. Such multiview displays would have the support layer 206 placed directly against the first surface 214 of the plate light guide 210. As a result, at least a portion of light incident on the first surface 214 adjacent to the support layer 206 leaks into the support layer 206, creating an optical drain into the support layer 206 through which light is lost.

Returning to FIG. 3, each multibeam element 220 is configured to couple out a portion of light as coupled-out light into a corresponding multiview pixel 232. For example, in FIG. 3, a portion of the light 302 incident on multibeam element 220 produces coupled-out light represented by diverging directional arrows 238 that pass through the light valves of the multiview pixel 232. The plate light guide 210 may include a reflector (not illustrated) at an end of the plate light guide 210 opposite the edge along which light is input to the plate light guide 210. The reflector reflects the light 302 back into the plate light guide 210 to recycle light, as represented by an arrow 306 in FIG. 3. Recycling light in this manner may increase brightness of the multiview backlight 202 (e.g., an intensity of the coupled-out light) by making light available more than once.

In the example illustrated in FIGS. 2B-2C, the reflective layer 204 of the multiview display 200 described above is a continuous rectangular-shaped object placed on the first surface 214 of the plate light guide 210. In other embodiments, a reflective layer of the multiview display 200 may comprise reflective segments disposed on the first surface 214 of the plate light guide 210.

Figure 6A:
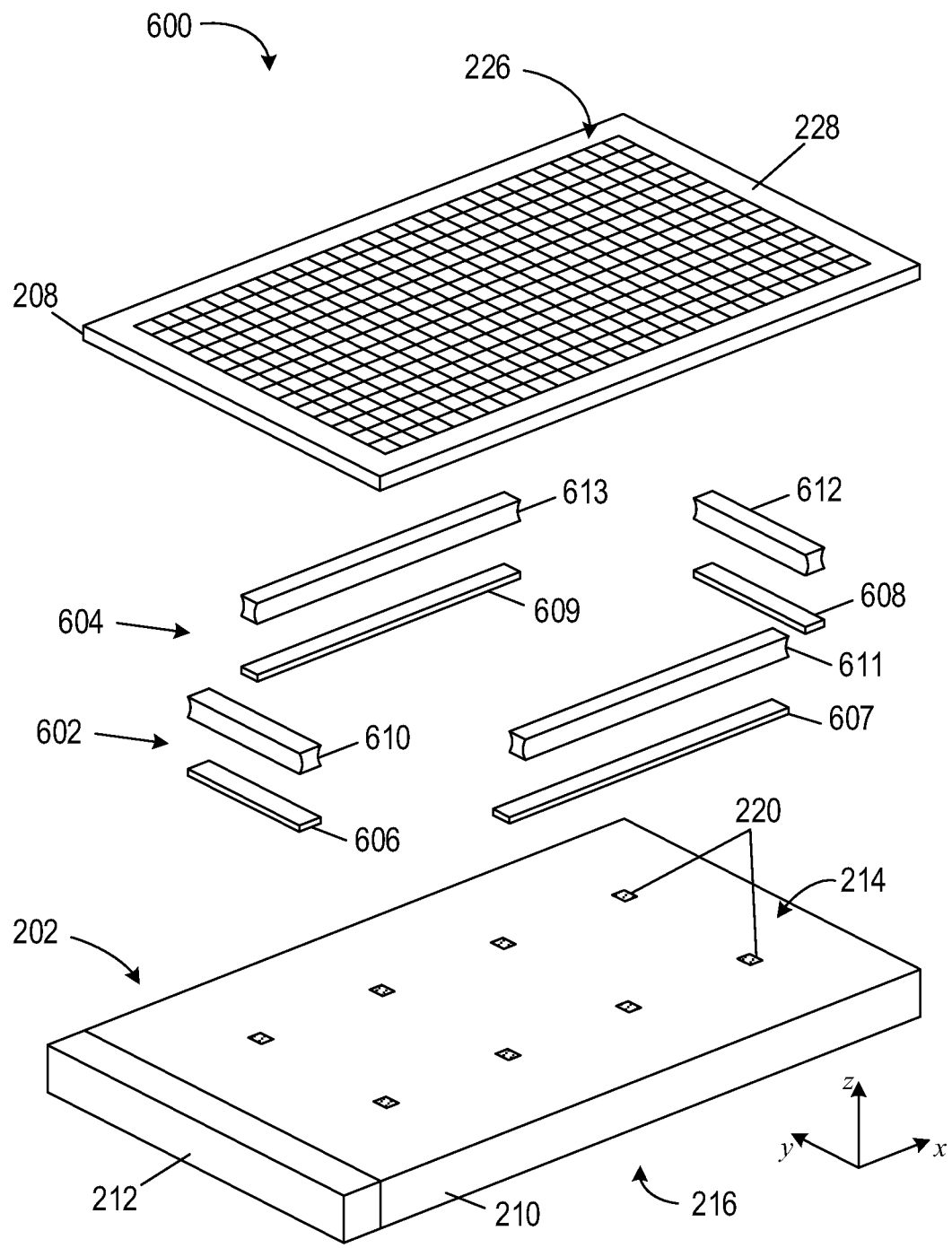
FIG. 6A illustrates an exploded isometric view of an example multiview display configured with a segmented reflective layer.

FIG. 6A illustrates an exploded isometric view of a display 600 that is similar to the multiview display 200 but the reflective layer 204 and the support layer 206 of the multiview display 200 are replaced by a segmented reflective layer 602 and a segmented support layer 604. As illustrated in FIG. 6, the display 600 includes the multiview backlight 202 and the screen 208 described above with reference to FIGS. 2A-2C. The reflective layer 602 comprises straight reflective segments 606-609. The support layer 604 comprises straight support segments 610-613. When the display 600 is assembled, the reflective segments 606-609 are located near edges of the first surface 214 and the support segments 610-613 are located on the corresponding reflective segments 606-609. The segmented reflective layer 602 and the segmented support layer 604 form a reflective support structure that separates the screen 208 from the plate light guide 210.

Figure 6B:
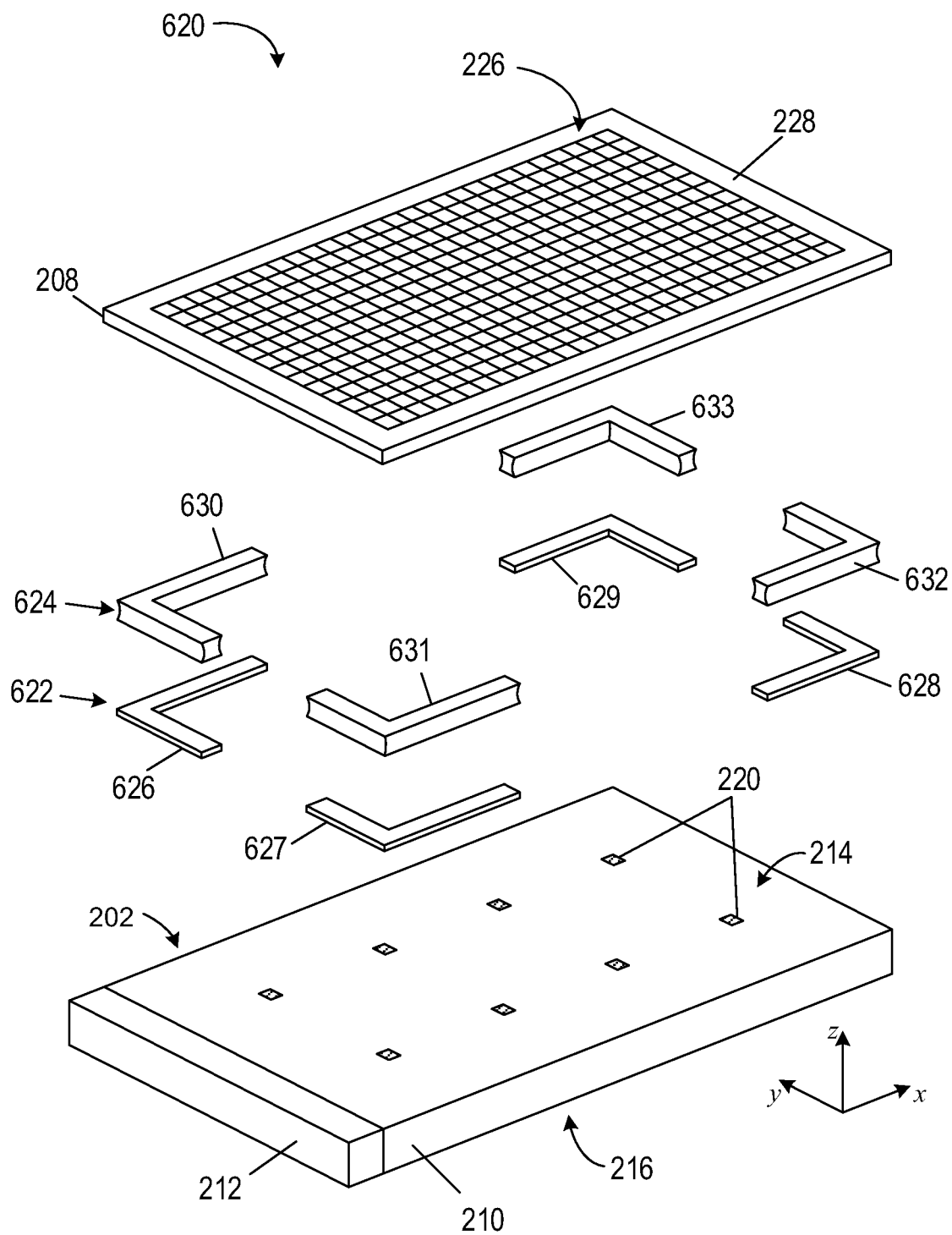
FIG. 6B illustrates an exploded isometric view of an example multiview display configured with a segmented reflective layer.

FIG. 6B illustrates an exploded isometric view of a display 620 that is similar to the multiview display 200 but the reflective layer 204 and the support layer 206 of the multiview display 200 are replaced by a segmented reflective layer 622 and a segmented support layer 624. As illustrated in FIG. 6B, the display 620 includes the multiview backlight 202 and the screen 208 described above with reference to FIGS. 2A-2C. The reflective layer 622 comprises bent reflective segments 626-629. The support layer 624 comprises bent support segments 630-633. When the display 620 is assembled, the bent reflective segments 626-629 are located near the corners of the first surface 214 and the support segments are located on the corresponding bent reflective segments 606-609. The segmented reflective layer 622 and the segmented support layer 624 form a reflective support structure that separates the screen 208 from the plate light guide 210.

Figure 7:
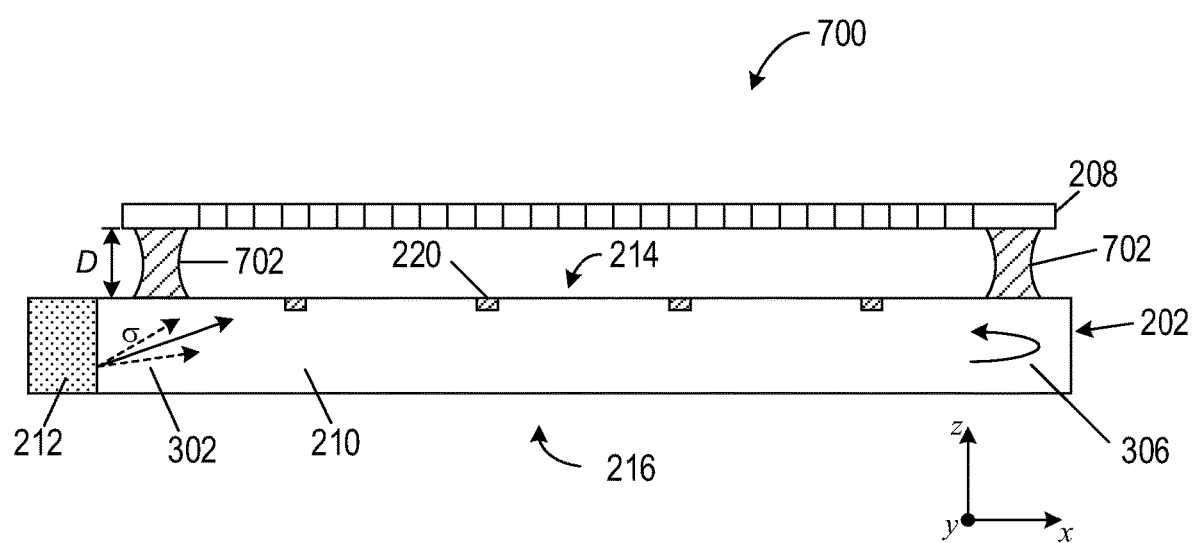
FIG. 7 illustrates a cross-sectional view of an example multiview display configured with a reflective support layer.

In other embodiments, a reflective support structure that separates the screen 208 from the plate light guide 210 may be comprised of a reflective material. FIG. 7 shows a cross-sectional view of an example display 700 that is similar to the multiview display 200 except the reflective support structure of the multiview display 200 (i.e., the reflective layer 204 and the support layer 206) are replaced with a reflective support structure 702 that separates the screen 208 from the first surface 214 of the plate light guide 210 by the distance D. The reflective support structure 702 is located near the edges of the first surface 214 of the plate light guide 210. The reflective support structure 702 may be an adhesive that adheres and affixes the screen 208 to the plate light guide 210 and also comprises a reflective material, such as silver or aluminum. The reflective support structure 702 may have a continuous rectangular shape with an opening 704 the enables diffractively coupled-out light from the diffraction grating to propagate unblocked to the light valve array 226. In other embodiments, the reflective support structure 702 may be a segmented reflective support structure with segments located near the edges and corners of the first surface 214. The reflective support structure 702 serves as a nearly perfect specular reflector by reflecting light that is incident on any portion of the first surface 214 that abuts the reflective support structure 702 back into the plate light guide 210 in the same manner as the reflective layer 204 described above with reference to FIG. 5.

According to various embodiments, the multibeam elements 220 may comprise any of a number of different structures configured to couple out a portion of the light 302. For example, the different structures may include, but are not limited to, diffraction gratings, micro-reflective elements, micro-refractive elements, or various combinations thereof. According to some embodiments, diffractive features of the diffraction grating may comprise one or both of grooves and ridges that are spaced apart from one another. The grooves or the ridges may comprise a material of the plate light guide 210, e.g., the grooves and ridges may be formed in a surface of the plate light guide 210. In another example, the grooves or the ridges may be formed from a material other than the plate light guide material, e.g., a film or a layer of another material on a surface of the plate light guide 210.

Figure 8A:
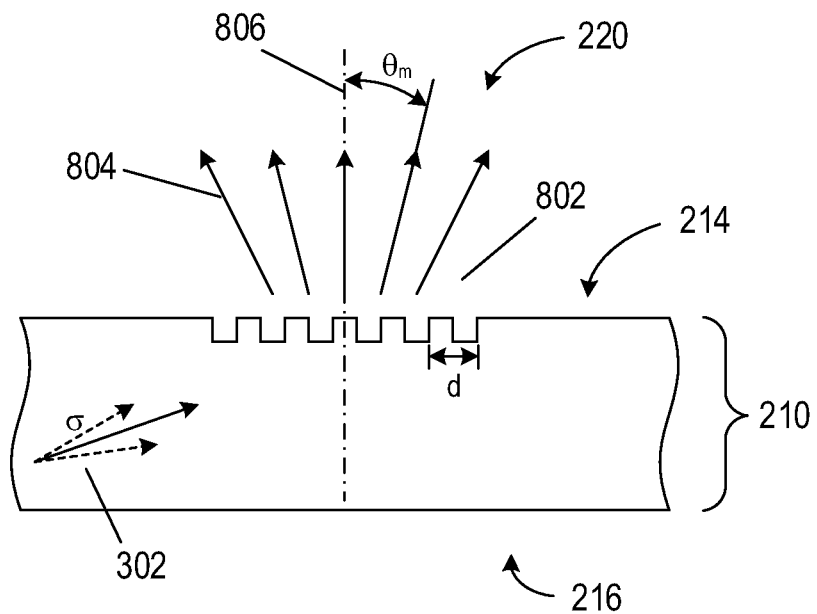
FIG. 8A illustrates a cross-sectional view of an example multibeam element of a plate light guide configured as a transmittable diffraction grating.

FIG. 8A illustrates a cross-sectional view a multibeam element 220 of the plate light guide 210 configured as a diffraction grating 802 in the first surface 214 of the plate light guide 210. The diffraction grating 802 comprises diffractive features with spacing between diffractive features represented by d, which is wider than one or more wavelengths of the light 302. Consider light of a particular wavelength λ interacting with the diffraction grating 802. The light is transmitted and scattered in different directions by the diffractive features. Waves of the light emerge from the diffraction grating 802 with different phases. As a result, the waves constructively and destructively interfere to create beams of light where the waves constructively interfere. For example, when the path difference between the waves of the light emerging from adjacent diffractive features is half the wavelength (i.e., λ/2), the waves emerge out of phase and may be cancelled through destructive interference. On the other hand, when the path difference between the waves emerging from adjacent diffractive features equals the wavelength λ, the waves constructively interfere creating light with maximum intensity. Beams of light that emerges with maxima intensity from the diffraction grating are represented by directional arrows 804 and the diffraction angles at which light emerges from the diffraction grating 802 with respect to a normal 806 to the first surface 214 may be calculated according to the diffraction equation:

$$\theta_m = \sin^{-1}\left(n\sin\theta_i - \frac{m\lambda}{d}\right) \quad (2)$$

where m is the diffraction order (i.e., m= . . . , −2, −1, 0, 1, 2, . . . );

n is the refractive index of the plate light guide 210;

$\theta_i$ is the angle of incidence of light 302 with respect to the normal 806; and $\theta_m$ is the diffraction angle with respect to the normal 806 of the m-th beam of light diffractively coupled out from the plate light guide 210.

Figure 8B:
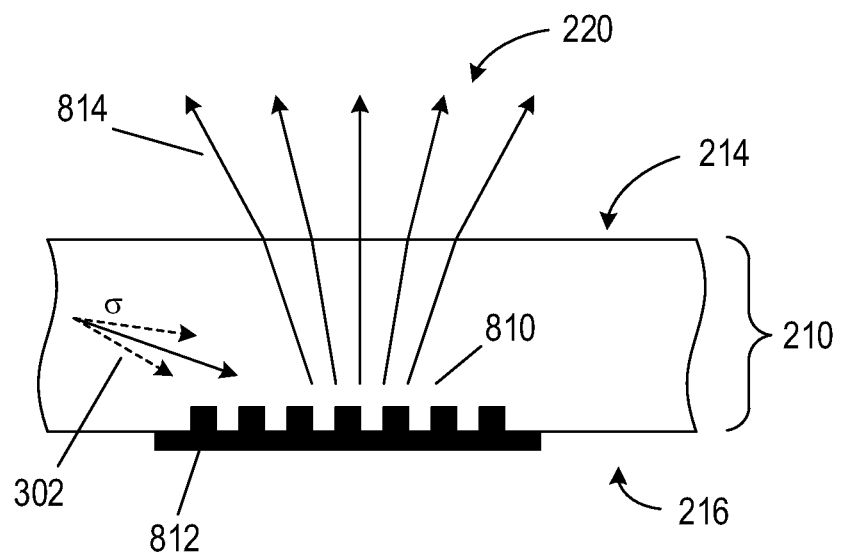
FIG. 8B illustrates a cross-sectional view of an example multibeam element of a plate light guide configured as a reflective diffraction grating.

In another example, as illustrated in FIG. 8B, the multibeam element 220 is a diffraction grating 810 located at or adjacent to the second surface 216 of the plate light guide 210. The multibeam element includes a reflective coating 812 that fills the diffractive features of the diffraction grating 810 to create a reflective diffraction grating. The reflective coating 812 reflects the diffracted light toward the first surface 214 to exit through the first surface 214 as the diffractively coupled-out light 814. The diffractively coupled-out light 814 that emerges from the plate light guide 210 along the first surface 214 is refracted as a result of traveling from the higher refractive index material of the plate light guide 210 into the lower refractive index of air, which causes the diffractively coupled-out light 814 to spread. The spacing of the diffractive features of the diffraction grating 810 may be selected to account for spreading of the light emerging from the plate light guide 210.

In other embodiments (not illustrated), the multibeam elements 220 may be diffraction gratings located between the first and second surfaces 214, 216 of the plate light guide 210. Note that, in some embodiments, the principal angular directions of the coupled-out light created by the multibeam elements 220 may include an effect of refraction due to the coupled-out light exiting the plate light guide 210 into air.

In some embodiments, the diffraction gratings of the multibeam elements may be uniform diffraction gratings in which the diffractive feature spacing is substantially constant or unvarying throughout the diffraction grating. In other embodiments, the multibeam elements may be chirped diffraction gratings. The diffractive feature spacing of a chirped diffraction grating varies across an extent or length of the chirped diffraction grating. In some embodiments, a chirped diffraction grating may have or exhibit a chirp of the diffractive feature spacing that varies linearly with distance. As such, the chirped diffraction grating is a 'linearly chirped' diffraction grating. In other embodiments, the chirped diffraction grating may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle chirp or sawtooth chirp, may also be employed. Combinations of any of non-linear chirps may also be employed.

Figure 9:
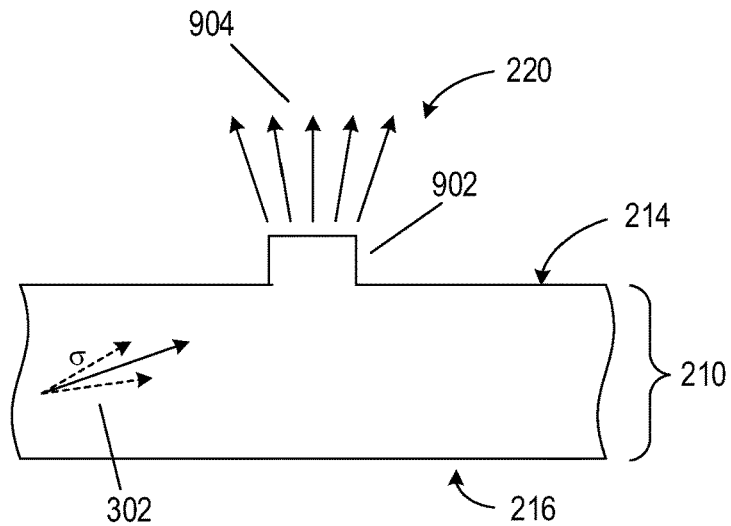
FIG. 9 illustrates a cross-sectional view of an example multibeam element of a plate light guide configured as a micro-refractive element.

In other embodiments, the multibeam elements 220 may comprise micro-refractive elements configured to refractively couple out portions of the light 302 as the coupled-out light. FIG. 9 illustrates a cross-sectional view of the plate light guide 210 in which a multibeam element 220 comprises a micro-refractive element 902. According to various embodiments, the micro-refractive element 902 is configured to refractively couple out a portion of the light 302 from the plate light guide 210 as the coupled-out light 904. The micro-refractive element 902 may have various shapes including, but not limited to, a semi-spherical shape, a rectangular shape or a prismatic shape (i.e., a shape having sloped facets). According to various embodiments, the micro-refractive element 902 may extend or protrude out of the first surface 214 of the plate light guide 210, as illustrated, or may be a cavity or recess in the first surface 214 (not illustrated). In some embodiments, the micro-refractive element 902 may comprise a material of the plate light guide 210. In other embodiments, the micro-refractive element 902 may comprise another material adjacent to, and in some examples, in contact with the first surface 214.

Figure 10A:
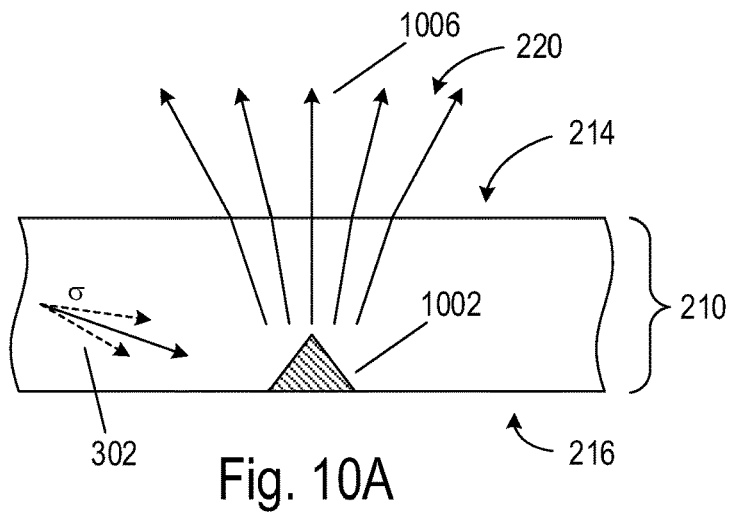
FIG. 10A illustrates a cross-sectional view of an example multibeam element of a plate light guide configured as a prismatic-shaped micro-reflective element.
Figure 10B:
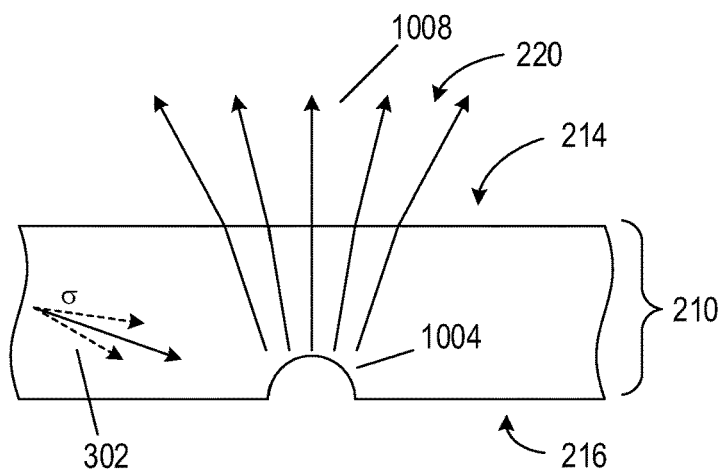
FIG. 10B illustrates a cross-sectional view of an example multibeam element of a plate light guide configured as a semi-spherical micro-refractive element.

In other embodiments, the multibeam elements 220 may comprise micro-reflective elements configured to reflectively couple out portions of the light 302 as the coupled-out light. FIG. 10A illustrates a cross-sectional view of the plate light guide 210 in which a multibeam element 220 comprises a prismatic-shaped micro-reflective element 1002 located along the second surface 216. FIG. 10B illustrates a cross-sectional view of the plate light guide 210 in which a multibeam element 220 comprises a semi-spherical micro-refractive element 1004 located along the second surface 216. The micro-reflective elements 1002 and 1004 may include, but are not limited to, a reflector that employs a reflective material or layer thereof (e.g., a reflective metal) or a reflector based on TIR. In other embodiments (not illustrated), the micro-reflective element may be located within the plate light guide 210 between the first and second surfaces 214, 216. In FIG. 10A, the prismatic-shaped micro-reflective element 1002 has reflective facets located adjacent to the second surface 216 of the plate light guide 210. The facets of the prismatic micro-reflective element 1002 are configured to reflect (i.e., reflectively couple) a portion of the light 302 out of the plate light guide 210. The facets may be slanted or tilted (i.e., have a tilt angle) relative to a propagation direction of the light 302 to reflect the light portion out of plate light guide 210, for example. The facets may be formed using a reflective material within the plate light guide 210 (e.g., as illustrated in FIG. 10A) or may be surfaces of a prismatic cavity in the second surface 216, according to various embodiments. When a prismatic cavity is employed, either a refractive index change at the cavity surfaces may provide reflection (e.g., TIR) or the cavity surfaces that form the facets may be coated with a reflective material to provide reflection, in some embodiments. In FIG. 10B, the semi-spherical micro-reflective element 1004 has a substantially smooth, curved surface. The surface curvature of the semi-spherical micro-reflective element 1004 reflects the portion of the light 302 depending on a point of incidence the light 302 makes with the curved surface. The semi-spherical micro-reflective element 1004 in FIG. 10B may be either a reflective material within the plate light guide 210 or a cavity (e.g., a semi-circular cavity) formed in the second surface 216, as illustrated in FIG. 10B. Note that, in FIGS. 10A and 10B, the principal angular directions of the coupled-out light 1006 and 1008 are refracted due to a change in refractive index as the coupled-out light 1006 and 1008 cross the first surface 214 into air.

Figure 11:
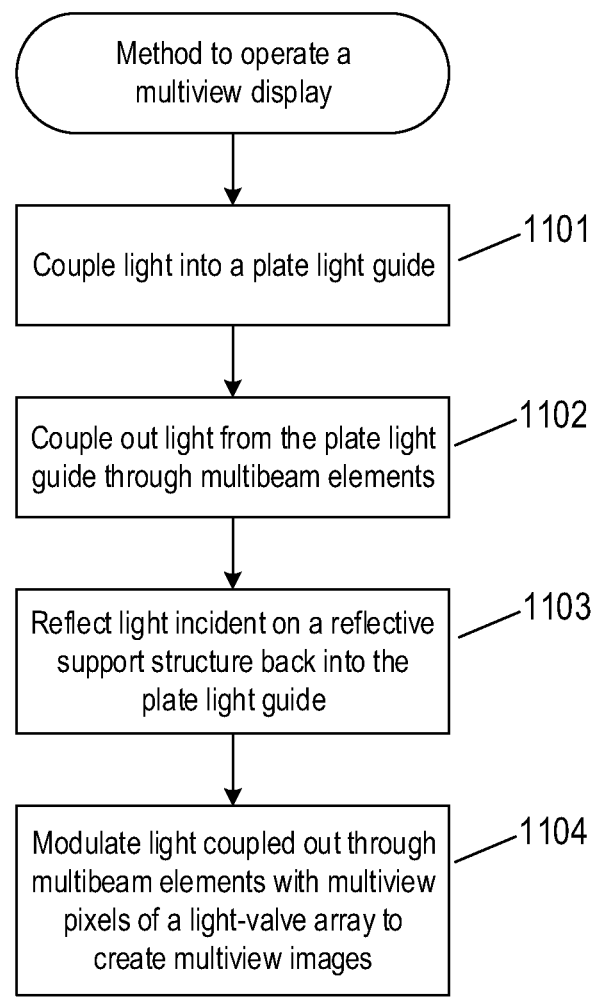
FIG. 11 illustrates a flow diagram of a method to display multiview images.

FIG. 11 illustrates a flow diagram of a method to operate a multiview display. In block 1101, light generated by a light source is optically coupled into a plate light guide to create light that propagates within the plate light guide, as described above with reference to FIGS. 2A-2C. In block 1102, a portion of the light is coupled out of the plate light guide through multibeam elements as described above with reference to FIG. 3. In block 1103, light that is incident on a portion of the surface that abuts a reflective support structure is reflected back into the plate light guide, as described above with reference to FIG. 5. The reflective support structure is configured to allow transmission of the light coupled out light from the multibeam elements. In block 1104, the coupled out light is modulated using multiview pixels of a light valve array located on the reflective support structure to create an image.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. A multiview display comprising:
   an array of multiview pixels configured to provide a plurality of different views of the multiview display, a multiview pixel comprising a plurality of light valves configured to modulate a plurality of light beams;
   a plate light guide configured to guide light and having an array of multibeam elements, a multibeam element of the array being configured to couple out a portion of the guided light as the plurality of light beams and to provide the light beam plurality to a corresponding multiview pixel, light beams of the light beam plurality having different principal angular directions from one another corresponding to different view directions of the different views of the multiview display, a size of a multibeam element of the multibeam element array being comparable to a size of a light valve of the light valve plurality, and an inter-element distance between adjacent multibeam elements of the multibeam element array corresponding to an inter-pixel distance between adjacent multiview pixels of the multiview pixel array; and a reflective support structure located between the array of multiview pixels and the plate light guide to separate the array of multiview pixels from the plate light guide, the reflective support structure comprising a reflective material located adjacent to a light-emitting surface of the plate light guide, the reflective material configured to reflect light incident from the plate light guide on a portion of the light-emitting surface of the plate light guide that abuts the reflective support structure back into the plate light guide.

2. The multiview display of claim 1, wherein the inter-element distance between the multibeam elements is substantially equal to the inter-pixel distance between the multiview pixels.

3. The multiview display of claim 1, wherein the size of the multibeam element is greater than one half of the light valve size and less than twice the light valve size.

4. The multiview display of claim 1, further comprising a light source optically coupled to the plate light guide and configured to provide light to the plate light guide as the guided light.

5. The multiview display of claim 4, wherein the light source is further configured to provide the light to the plate light guide at a non-zero propagation angle and collimated according to a collimation factor to provide a predetermined angular spread of the guided light within the plate light guide.

6. The multiview display of claim 1, wherein the multibeam element comprises one of a diffraction grating, a micro-reflective element and a micro-refractive element optically connected to the plate light guide to couple out the portion of the guided light.

7. The multiview display of claim 1, wherein the reflective support structure comprises:
a reflective layer of the reflective material located on the light-emitting surface adjacent to an edge of the plate light guide; and
a support layer located between the reflective layer and the plurality of light valves of the multiview pixel array, wherein the support layer is configured to adhere the plurality of light valves to the reflective layer.

8. The multiview display of claim 1, wherein the reflective material of the reflective support structure comprises one or more of silver and aluminum.

9. The multiview display of claim 1, wherein the plurality of light valves of the array of multiview pixels is configured to modulate the plurality of light beams to create a multiview image.

10. The multiview display of claim 1, wherein the light valves comprise liquid crystal light valves.

11. A method of operating a multiview display, the method comprising:
optically coupling light generated by a light source into a plate light guide, the plate light guide guiding the light in a propagation direction along a length of the plate light guide and within the plate light guide;
coupling a portion of the guided light out of the plate light guide using a multibeam element to provide a plurality of coupled-out light beams having different principal angular directions corresponding to respective different view directions of the multiview display;
reflecting guided light incident on a portion of a light-emitting surface of the plate light guide that abuts a reflective support structure back into the plate light guide using the reflective support structure, the reflective support structure comprising a reflective material located adjacent to the light-emitting surface of the plate light guide; and
modulating the coupled-out light beams using an array of light valves of a multiview pixel of the multiview display to provide different views of a multiview image corresponding to the different view directions of the multiview display, a size of the multibeam element being comparable to a size of a light valve in the light valve array of the multiview pixel.

12. The method of claim 11, wherein the multibeam element comprises a diffraction grating optically coupled to the plate light guide to diffractively couple out the guided light portion.

13. The method of claim 11, wherein the reflective support structure comprises:
a reflective layer located adjacent to an edge of the light-emitting surface of the plate light guide, the reflective layer comprising the reflective material; and
a support layer located between the reflective layer and the array of light valves, the support layer adhering the light valve array to the reflective layer.

14. The method of claim 11, wherein the reflective support structure comprises an adhesive and the reflective material.

15. A multiview display comprising:
a screen comprising a plurality of light valves;
a backlight comprising a plate light guide and an array of multibeam elements optically coupled to the plate light guide, a size of a multibeam element of the multibeam element array being comparable to a size of a light valve of the light valve plurality; and
a reflective support structure located on a surface of the plate light guide between the screen and the plate light guide, the reflective support structure comprising a reflective material located adjacent to a light-emitting surface of the plate light guide, the reflective material configured to reflect light incident from the light guide on the reflective support structure at the surface back into the plate light guide.

16. The multiview display of claim 15, wherein a multibeam element of the array is configured to couple out a portion of light guided by the plate light guide as a plurality of light beams having different principal angular directions from one another corresponding to different view directions of different views of the multiview display.

17. The multiview display of claim 15, wherein a set of light valves of the plurality of light valves correspond to a multibeam element, the set of light valves representing a multiview pixel of the multiview display, and wherein an inter-element distance between adjacent multibeam elements of the multibeam element array corresponds to an inter-pixel distance between adjacent multiview pixels.

18. The multiview display of claim 15, wherein the size of the multibeam element is greater than one half of the light valve size and less than twice the light valve size.

19. The multiview display of claim 15, wherein the multibeam element comprises one or more of a diffraction grating, a micro-reflective element and a micro-refractive element optically connected to the plate light guide to couple out a portion of light guided by the plate light guide.

20. The multiview display of claim 15, further comprising a light source optically coupled to the plate light guide and configured to provide light to the plate light guide as guided light at a non-zero propagation angle and collimated according to a collimation factor, the non-zero propagation angle and collimation to provide a predetermined angular spread of the guided light within the plate light guide.

21. The multiview display of claim 15, wherein the reflective support structure comprises:
- a reflective layer of the reflective material located on the plate light guide surface adjacent to an edge of the plate light guide; and
- a support layer located between the reflective layer and the screen, wherein the support layer is configured to affix the screen to the plate light guide.

* * * * *